FREDERICK W. REYNOLDS
ARTHUR E. MEIXNER
INVENTORS

BY S. A. Giannatana
George B. Oujevolk
ATTORNEYS

FREDERICK W. REYNOLDS
ARTHUR E. MEIXNER
*INVENTORS*
BY S. A. Giarratana
George B. Oujevolk
ATTORNEYS

FREDERICK W. REYNOLDS
ARTHUR E. MEIXNER
*INVENTORS*

BY S. A. Giarratana
George B. Oujevolk
ATTORNEYS

United States Patent Office 3,447,234
Patented June 3, 1969

3,447,234

PHOTOCONDUCTIVE THIN FILM CELL RESPONDING TO A BROAD SPECTRAL RANGE OF LIGHT INPUT

Frederick W. Reynolds, Ridgewood, and Arthur E. Meixner, Saddle Brook, N.J., assignors to Singer-General Precision, Inc., a corporation of Delaware Filed Oct. 12, 1964, Ser. No. 403,124
Int. Cl. B01j *17/00;* H01l *15/02*
U.S. Cl. 29—572 5 Claims

ABSTRACT OF THE DISCLOSURE

The process of making a photoconductor photocell comprising the steps of depositing an indium thin film bonding agent on a glass substrate; depositing a gold thin film on the glass substrate over the indium thin film, the indium thin film serving to bond the gold thin film thereto; forming electrodes from the gold film by etching away narrow sections thereof to define the boundaries of a cadmium selenide photoconductive cell; depositing an extremely thin film of cadmium selenide material over the defined boundaries as well as at least partially over the electrodes; and, depositing a suitable acceptor impurity over the cadmium selenide layer.

The present invention relates to photoconductive cells, and more particularly to a photoconductive cell having a good response over a broad range of the light spectrum.

A photoconductive cell changes in resistance when exposed to light so that if a battery or other voltage source is connected in series with this light variable resistance, fluctuations in current will arise from the change in light. This characteristic is in contrast to a photovoltaic cell which will create a difference or drop in potential in response to light incident thereon.

The basic materials for photoconductive cells are well known, and, it is also well known that photoconductive conductivity is affected by two principal factors, namely, the imperfections in the crystal itself or defects, and imperfections which are purposely incorporated in the crystal, otherwise known as impurities. The theory has been advanced by some that similar electronic effects can be caused by both impurities and defects. An important use of photoconductive cells today is in star tracking. As has been shown in the Irving Brenholdt U.S. patent application, Ser. No. 322,135, filed Nov. 7, 1963, it is important in tracking certain stars such as Venus, Polaris, etc., that the width of the photoconductive slit be very narrow and that the photoconductive cell has a peak conductive value for certain wavelengths. It is not easy to build such photoconductive cells and masking and filter techniques are not always possible. To increase the star catalog which can be used in star tracking, a wide spectral band response is desirable. From extensive experimentation, it would appear that the cadmium selenide cells are the most desirable for this application, because of a very rapid cell response. However, presently available cadmium selenide cells have a very narrow response band as shown by Richard H. Bube "Photoconductivity of Solids," John Wiley and Sons, 1960, page 167, wherein graphs are shown for the photoconductivity excitation for CdS:Cu and CdSe:Cu powders, the copper being the acceptor impurity. For star tracking applications, a wide band response is required for the device to be useful for other than perfect conditions of visibility, and also, the response should be tailor-made by a reversible process to fit the photoconductor cell for its use. Although attempts may have been made to provide such a photoconductive cell, none, as far as we are aware, have ever been successful when carried out into practice.

Therefore, the principal object of the present invention is to provide a process to enable one to fabricate small area, high sensitivity, evaporated thin photoconductive films of CdSe, having a broad spectral response in the visible region. Furthermore, the spectral response and the gain of the photoconductor can be tailored by a reversible process.

The invention, as well as other objects and advantages thereof, will become more apparent from the following description when taken together with the accompanying drawing, in which, FIG. 1 is a schematic representation of the apparatus used during one stage of the process;

Generally speaking, the present invention contemplates making a photoconductor cell having a response over a wide band of the spectrum by first depositing an indium oxide thin film on a glass substrate to act as a bonding agent; depositing a gold thin film over the indium thin film; forming electrodes from the gold-indium films by etching away narrow sections thereof to define the boundaries of a cadmium selenide photoconductive cell; depositing a thin film of cadmium selenide material over the defined boundaries as well as at least partly over the electrodes; and, depositing a suitable acceptor impurity over the cadmium selenide layer. It is believed that the band width of the peak response is related to the homogeneous character of the photoconductor and that by having a suitably homogeneous photoconductor, in addition to photons normally causing a peak response, other photons from wavelengths adjacent thereto will penetrate the photoconductor sufficiently to cause electrons therein to move into the conduction band thereof providing a change in the cell resistance characteristics. With a thin enough cell, the cell responds to a wider band of photons and displays more uniform response characteristics over the entire response band.

In carrying the invention into practice, an indium thin film is vacuum deposited upon a suitable, transparent, insulating glass substrate. Corning 7059 has been found satisfactory, but other similar material can be used. This film may range from about 20 to about 50 A. thickness. This film is then oxidized by heating in air at a temperature of about 100° C. to about 200° C. A gold thin film of the order of 1000 A. thickness is then vacuum deposited over the oxidize indium film. Standard vacuum deposition techniques are employed such as described in L. Holland, Vacuum Deposition of Thin Film, John Wiley & Sons, N.Y., 1956, chapter VI.

The desired electrode pattern is now obtained by etching away unwanted areas of the gold-indium oxide thin film with a dilute aqua rega solution. Standard etching techniques are used.

The substrate is then heated in air to about 500° C. for about one hour to remove any impurities which may have been acquired during the etching process.

Figure 1:
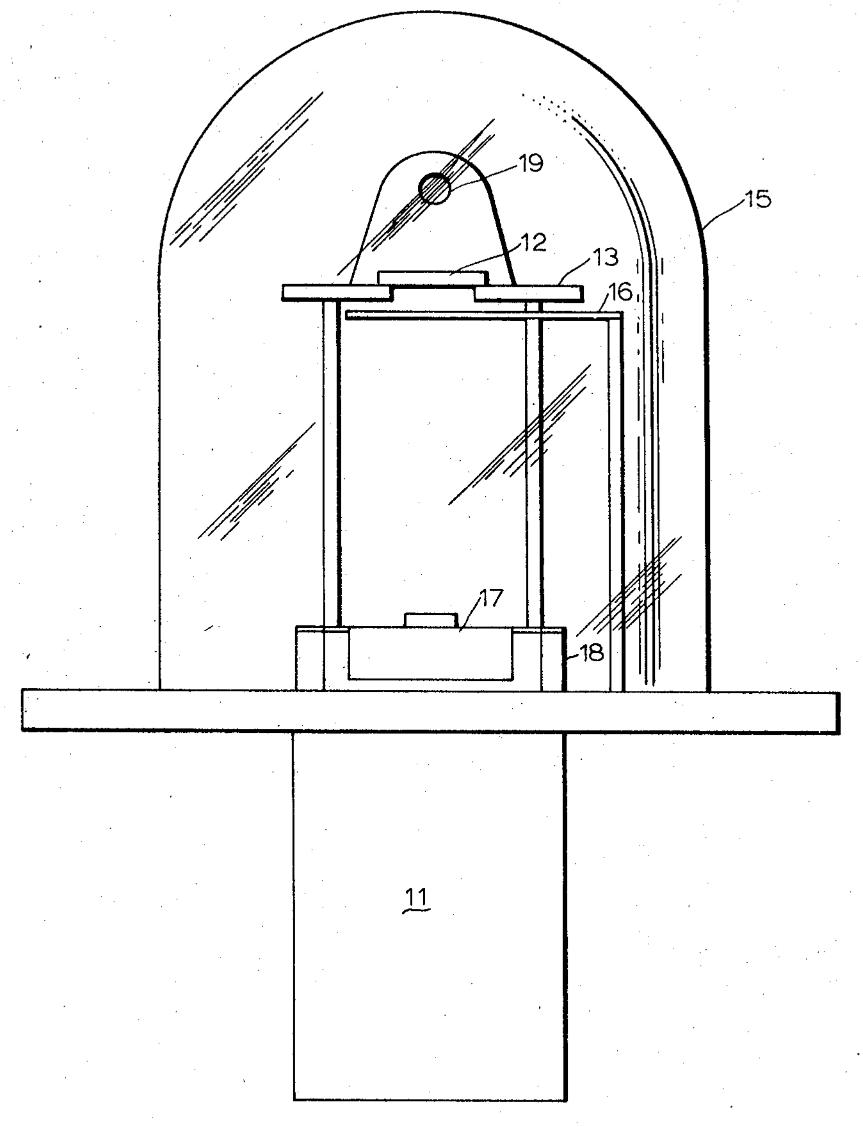

The substrate is then placed in the vacuum system shown in FIGURE 1. The pump 11 is a suitable size and type necessary to provide a pressure of about $10^{-6}$ mm. Hg. (See Saul Dushman, Scientific Foundations of Vacuum Technique, John Wiley & Sons, N.Y., 1962, chapter III). The substrate 12 is placed upon the holder 13 with the gold side downward. The holder rests upon a quartz cylinder which also serves to provide a closed system within the main bell jar 15. A shutter 16 is placed between the substrate 12 and the source 17 to block the vapor stream during outgassing of the source. The source is a baffled type which does not allow the source material, i.e., high purity CdSe powder, to see the substrate directly. The source is outgassed by passing a current through the electrodes 18 sufficient to heat the source to about 500° C. for 1 or 2 minutes.

The substrate 12 is also outgassed by the substrate heater 19. Current is pased thru the heater element sufficient to raise the substrate temperature to about 500° C., and this temperature is maintained for about one-half hour. The substrate temperature is then brought to about 250° C. and maintained at this temperature during evaporation of the CdSe.

Evaporation of the CdSe is accomplished by heating the source until an evaporation rate of about 1000 A./min. is obtained. The shutter is then removed and the CdSe is evaporated upon the substrate for about 10 minutes.

After evaporation the film is annealed by heating the substrate to about 400° C. and maintaining this temperature for about one hour. The system is allowed to cool to room temperature and the workpiece is removed. Techniques of measuring temperatures and evaporation rates may be obtained from the reference hereinbefore mentioned, e.g., Holland, Dushman, etc.

After the film is removed from the system, the resistance is measured in the absence of light and in room light, e.g., about 30 foot-candles. This reading is converted to determine the film resistivity. Values and ranges of resistivity is typical as evaporated samples are:

$P_L \simeq 350$ ohms cm.—(10–1000 ohms cm.)
$P_D \simeq 1000$ ohms cm.—(20–5000 ohms cm.)

(where L and D stand for light and dark).

Figure 2:
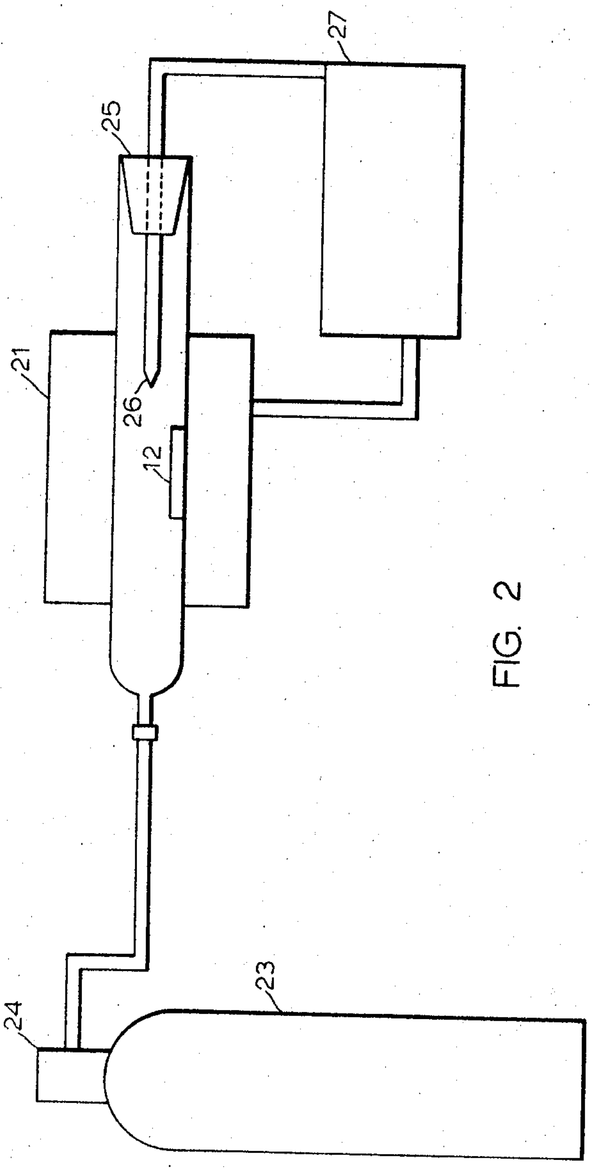
FIG. 2 illustrates in schematic form the apparatus used at a later stage of the process.
Figure 4:
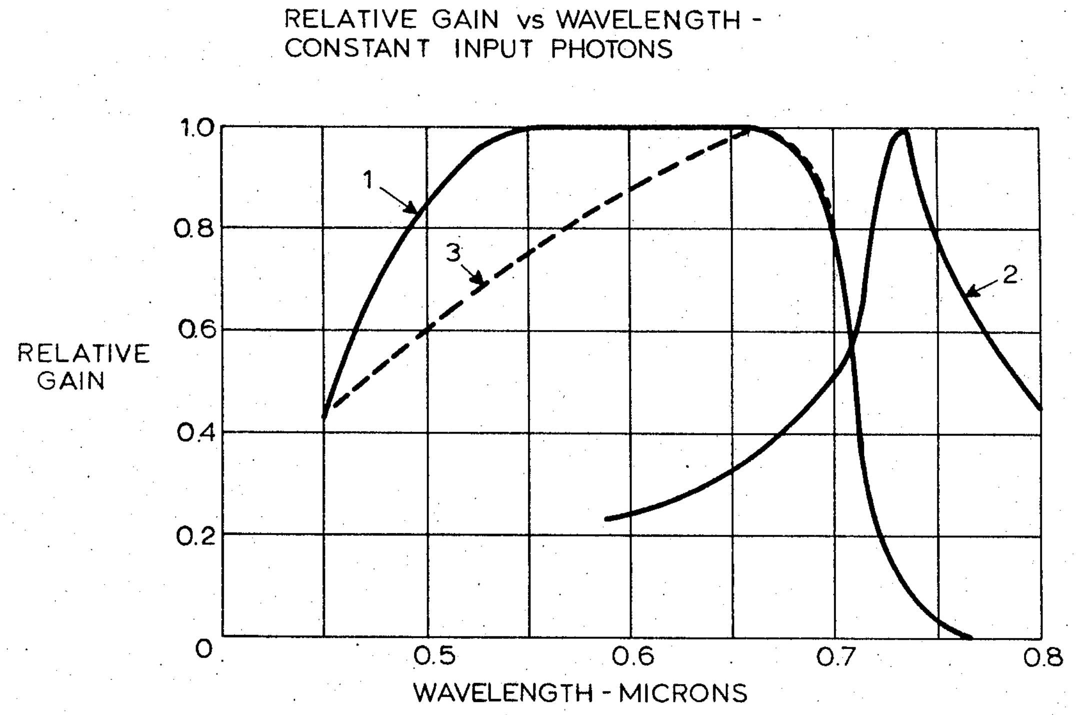

The workpiece is then placed in the furnace 21 shown in FIG. 2. Forming gas (15% $H_2$–85% $N_2$) is introduced from the tank 23 and passes thru the furnace at a rate of about 0.01 c.f./min. The flow is determined by the regulator 24. A plug 25 is placed in the opposite end of the furnace tube. The plug has a small opening which permits a slight positive pressure to be maintained in the furnace tube. A thermocouple 26 is placed in the furnace. The output from the thermocouple is fed to a controller 27 which controls the amount of power fed to the furnace, thereby maintaining the desired furnace temperature. The furnace is set to about 500° C. and the sample is heated in the reducing atmosphere for about one hour. The furnace is cooled and the sample is removed. The sample resistivity is measured. Values and ranges of typical reacted samples are:

$P_L \simeq .75$ ohm cm.—(0.01–10 ohms cm.)
$P_D \simeq .8$ ohms cm.—(0.1–10 ohms cm.)

The workpiece is then placed in a vacuum system capable of producing pressures of about $10^{-6}$ mm. Hg, and a charge of OFC (oxygen free copper) is evaporated upon the CdSe surface to obtain a copper overlay of about 20 A. thickness.

The workpiece is removed from the vacumm system and again placed into the furnace. The workpiece is heated to about 400° C. in a reducing atmosphere for about one hour. The workpiece resistivity is measured. Values and ranges of typical compensated workpieces are:

$P_L \simeq 15$ ohms cm.—(5–500 ohms cm.)
$P_D \simeq 7500$ ohms cm.—(1000–100,000 ohms cm.)

Figure 3:
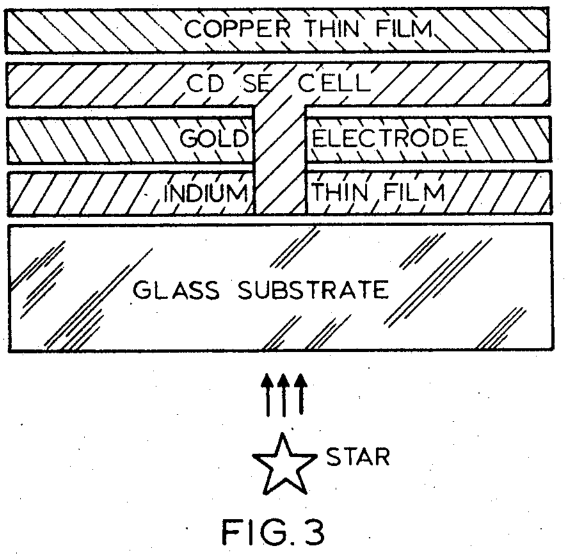
FIG. 3 is a schematic representation of a cell produced by the process herein described; and, FIG. 4 depicts in graph form the peak response obtainable by the process herein described.

This resultant product is a highly sensitive photoconductive cell as illustrated schematically in FIG. 3, having a spectral response characteristic similar to curve 1 on the graph, and rise time of about 4 milliseconds from dark to about 1 foot candle. As can be seen, curve 1 has a spectral response to wavelengths extending from 0.45 to 0.7 micron in contrast to photoconductor cells of the prior art which peak only at 0.725 micron as shown in curve 2.

At this point in the processing the characteristics of the photoconductor are not fixed, but may be varied to best suit the purpose of a particular application. That is, if it is desirable to increase the dark resistivity to reduce the dark cell curent, the film may be heated in air at about 300° C. for short periods of time (about 15 min.) and the resistivity or cell current measured between heating cycles until the desired dark resistivity is obtained. If it is desired to reduced the light resistivity to increase the light current, the sample may be heated in forming gas for short intervals at about 400° C. until the desired light resistivity is obtained. This process is reversible and the cell resistivity may be cycled back and forth a number of times. The spectral characteristic may thus be tailored to best suit a particular application, i.e., for some Stellar Sensor applications in daytime, blue response should go down. This may be accomplished by repeated air-forming gas cycles at about 300° C. As shown on the graph, curve 3, the response characteristics of the cell are altered to change the geometry of the response curve. In photoconductors made by the process of the present invention, the rise time in the dark is much shorter than for photoconductors of the prior art, i.e., a cell resistivity changes to $$\left(1-\frac{1}{e}\right)$$

of final value in about 40 milliseconds from dark to low illumination (about 1 foot-candle), and, by using the reversible process described, the light and dark conductivity may be tailored to suit a particular application. The technique can be applied to virtually any desired electrode pattern, since the electrodes are placed on the substrate before the photoconductor, and this enables the use of high accuracy etching techniques. Cells have been made with electrode separation of less than 0.0004 inch.

The procedure herein described may be varied somewhat. Gold does not have to be used as an electrode material. Aluminum has also been used successfully. Gold electrodes may be prepared without the indium underlay or with an underlay of another metal, e.g., Cu which has been used successfully. When copper is used as an underlay, however, it is not necessary to evaporate copper over the CdSe to obtain compensation, high dark resisitivity. Also, the substrate may vary. Besides Corning 7059 glass, quartz and hard microscope glass have been successfully used. The substrate need not be etched to obtain the desired electrode pattern. Successful films have also fabricated by physically masking to obtain the electrode pattern, or by physically abrading the gold underlay from the undesired area. The substrate need not be heated in air prior to CdSe deposition. In this case the resultant photoconductor will have a somewhat lower resistivity than one prepared in the manner described in the example.

A baffled source need not be used for deposition of CdSe. Other sources such as quartz tubes, alumina boats, etc., have been successfully used.

The evaporated film need not be heated in a reducing atmosphere prior to copper desposition. The resultant film, however, will require an air bake to achieve compensation, i.e., high dark resistivity.

A reducing atmosphere is not necessary to obtain the reversible effects described. Inert gas, e.g., argon, has also been successfully used to produce and to obtain films having the desired parameters.

It is to be observed therefore that the present invention provides for a photoconductor photocell useful for star tracker applications wherein thin film electrodes, e.g., gold separated by a minute distance to define a narrow cell slit, are bonded to a glass insulating substrate by a thin film bonding agent, e.g., indium. The narrow cell slit is occupied by a cadmium selenide photoconductor cell in contact with the glass substrate and extending at least partially over the electrodes. The cell in turn is overlayed by a thin film of impurities, e.g., copper. The cell exhibits an even response to a wide range of light inputs extending between wavelengths of between about 0.4 to about 0.8 microns. The photoconductor cell is usually installed in the optical system of a star tracker with the substrate disposed in the direction of the star to be tracked or identified.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process of making a photoconductor photocell comprising the steps of depositing an indium thin film bonding agent on a glass substrate; depositing a gold thin film on the glass substrate over the indium thin film, the indium thin film serving to bond the gold thin film thereto; forming electrodes from the gold film by etching away narrow sections thereof to define the boundaries of a cadmium selenide photoconductive cell; depositing an extremely thin film of cadmium selenide material over the defined boundaries as well as at least partially over the electrodes; and, depositing a suitable acceptor impurity over the cadmium selenide layer.

2. The process of claim 1, wherein the photoconductor photocell produced is then alternately heated in air and a reducing gas to vary the spectral response thereof.

3. A process as claimed in claim 2, wherein the deposited indium thin film is deposited to about 20 to about 50 A. thick and oxidized at a temperature of between about 100° C. to about 200° C., the gold thin film is deposited to about 1000 A. thick; and the substrate is heated in air prior to applying the cadmium selenide film to about 500° C. for about one hour to remove impurities acquired during the etching process.

4. A process as claimed in claim 3, wherein the cadmium selenide is deposited over the gold electrode and between the defined cell boundaries by placing the substrate over a source of powdered cadmium selenide with the gold disposed towards the cadmium selenide, but separated therefrom, heating the cadmium selenide until an evaporation rate of about 1000 A./minute is obtained, removing the separation so as to expose the substrate to the cadmium selenide evaporation, continuing the evaporation on the substrate for about ten minutes, and annealing the formed photoconductor cell.

5. The process of claim 4, wherein the reducing gas used on the photoconductor cell is forming gas.

References Cited

UNITED STATES PATENTS

| | | | |
|---|---|---|---|
| 2,759,861 | 8/1956 | Collins et al. | |
| 2,765,385 | 10/1956 | Thomsen | 338—15 X |
| 2,884,508 | 4/1959 | Czipott | 338—17 |
| 2,925,643 | 2/1960 | Haayman | 29—591 |
| 2,981,877 | 4/1961 | Noyce. | |
| 3,013,232 | 12/1961 | Lubin | 338—17 |
| 3,288,637 | 11/1966 | Ames | 117—217 X |

WILLIAM L. BROOKS, *Primary Examiner.*

U.S. Cl. X.R.

29—589; 117—217; 136—89; 338—15

PO-1050
(5/69)

UNITED STATES PATENT OFFICE
CERTIFICATE OF CORRECTION

Patent No. 3,447,234 Dated June 3, 1969

Inventor(s) F.W. Reynolds and A.E. Meixner

It is certified that error appears in the above-identified patent and that said Letters Patent are hereby corrected as shown below:

Column 3, line 67; the phrase "about 4 milliseconds" should read --about 40 milliseconds--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents